(12) United States Patent
Gates

(10) Patent No.: X9242
(45) Date of Patent: Nov. 14, 1835

(54) JAPAN, APPLIED TO LEATHER

(76) Inventor: William Gates

William Gates of Hanover New York
Letters Patent

The Schedule refered to in these Letters Patent and making part of the same containing a description in the words of the said William Gates, of his improvement in preparing Japan and applying it to Leather, To all to whom these presents shall come; Be it known that I William Gates of the town of Hanover in the County Chatauque and State of New York have invented a new and useful improvement in the art of preparing Elastic Japan for, and applying the same to leather. and that the following is an exact description thereof; Viz; The said improvement consists of two parts. First; in the method of compounding the Japan which is as follows. Boil in a copper or iron kettle two quarts of linseed oil until the yellow scum disappears, then add two ounces of pulverized umber, and one ounce of Lithrage, and continue to boil an hour and a half or more. Then set it by until the dryers settle. Then pour the oil from the sediment in order to prevent the Japan from being brittle from retention of the dryers. Secondly take a deep vessel that will bear heating, into which put eight ounces Caoutchouc or Elastic Gum. cut in fine shreds, and two quarts of spirits of turpentine, set the vessel into a kettle of hot water and heat a few minutes for the purpose of cutting the gum more readily, then add the two quarts of boiled oil above mentioned. the object of which is to prevent injuring the properties of the gum, as much as spirits of turpentine alone will do, and to enable the Japan to dry much sooner than when the gum is cut with raw oil or turpentine alone. The compound should then be kept at a boiling heat until the gum is dissolved, which will require about six hours. The vessel must be covered with a cap perforated in the centre for the transmission of a breaker, which must be frequently turned briskly by means of a bow string. Thirdly add to the above about eight ounces of Gum asphaltum. (the quantity however may be varied) heat over a moderate fire and stir it well until it dissolves. If the Japan is required thinner
the asphaltum may be melted in linseed oil prepared as above described,
and mix while hot. With care the vessel itself may be placed over the
fire during the whole process. If the gums should not be pure, or should
not entirely dissolve strain while hot.

The second part of the improvement consists in the method of apply-
ing this Japan to leather, which is as follows. viz. Take leather finish-
ed on either side with little or no stuffing, and well bleached, Place it
on a smooth table, set it down smooth and firm, Spread on a light
coat of the Japan with a common paint brush or sponge. then rub it
over with a thick glass slicker herein after described, Hang it to dry as
most convenient. In the winter season it should not be exposed to extreme
cold until the Japan has become partially dry. When sufficiently hard to
receive the second coat replace it on the table, Brush the surface thorough-
ly with a hard Brush in order to enable the Japan to adhere firmly and
uniformly. as many coats may be applied in the same manner as fan-
cy or utility may direct. The number however should not be less than three. each
succeeding coat must be thoroughly rubbed down for the purpose of smoothing
the surface thereby saving much labour in the process. of scouring hereinafter
mentioned. The sleeker must be rounded on one edge more than an ordina-
ry one to prevent forcing off the japan and the corners must be rounded to
prevent making indentations in the coat. When a sufficient number of
coats have been applied, and dried; spread the leather on a table her-
in after described, scour the surface smooth with a pumice stone
made smooth on one side and the edges rounded to prevent scratching
the leather using water on the surface of the leather, Then smooth or
polish with a scotch grey or water stone with the edges rounded, using
water as above. Then Clean the surface and apply one or two coats
of the japan reduced with ~~the~~ prepared oil and turpentine and strained.
Then polish with the sleeker and hang it where it will not be expos'd
to dust until it is thoroughly dried. It is then fit for use. If
the leather is to be used where it requires oil or stuffing it may be done on the opposite side from the japan after the japan has dried for
two or three months, with neats foot or other oil used in stuffing
leather; except fish oil, which should not be used in any case whatever.
The frame of the scouring table above mentioned must be made of two and
a half inch stuff for common use. The side pieces six feet long, and the end
pieces three and a half feet long, one side piece may be framed into the
end pieces firmly the other must be tenanted at the end and go
through long mortises made in the end pieces and keys made to drive
in the mortise behind the tenon to spread the frame which will strain
the top sufficient for use. The legs may be framed into the side pieces.
The top or bed must be of cloth or some other material that will give
a spring and made fast to the frame by cutting a groove into the top
of the side pieces, and fastening the long edges into the same with a tongue
The ends of the top or bed must be fastened by chamfering the upper in-
side edge of the end pieces of the frame and making holes slanting through to the
centre of the outside two inches apart hem a wire into the edge of the
cloth or other material of which the top or bed may be made, and pass
a cord ~~round~~ through the holes and round the wire. The surface must be
made smooth by painting and scouring. The table may be varied as to
size to suit the performer. The object in constructing the table as above
described is to give a yielding surface, on which to scour the surface of
the japan equally and smoothly without cutting it through in any place &
at the same time preclude the necessity of stretching every side of leather
on a frame. What I claim as my improvement or invention, and not
heretofore known is the particular method of compounding the japan, so as to make
it elastic and at the same time permit it to dry readily, and the manner
of applying it to the leather and oiling or stuffing the same when required after
it is japanned as above described, also the scouring table above de-
scribed. In testimony that the above is a true specification of my said
improvement as above described I have hereunto set my hand the 29th day
of July in the year of our Lord one thousand eight hundred & thirty five Witnesses
Wm [illegible]
[illegible] Mixer
(Patented. 14th Nov. 1835) (1316 [illegible])

William Gates

[illegible]